April 2, 1963 N. F. BOUNSALL 3,084,215

EDITING SYSTEMS FOR TELEVISION RECORDINGS

Filed Oct. 2, 1961 3 Sheets-Sheet 1

NORMAN F. BOUNSALL
INVENTOR.

BY Nathan N. Kallman

ATTORNEY

EDITING SYSTEMS FOR TELEVISION RECORDINGS

Filed Oct. 2, 1961 3 Sheets-Sheet 2

NORMAN F. BOUNSALL
INVENTOR.

BY Nathan N. Kallman

ATTORNEY

EDITING SYSTEMS FOR TELEVISION RECORDINGS

Filed Oct. 2, 1961 3 Sheets-Sheet 3

NORMAN F. BOUNSALL
INVENTOR.

BY Nathan N. Kallman

ATTORNEY

United States Patent Office 3,084,215

Patented Apr. 2, 1963

3,084,215
EDITING SYSTEMS FOR TELEVISION RECORDINGS

Norman F. Bounsall, Palo Alto, Calif., assignor to Ampex Corporation, Redwood City, Calif., a corporation of California Filed Oct. 2, 1961, Ser. No. 142,332
11 Claims. (Cl. 178—6.6)

This invention relates to systems for revising magnetic recordings and more particularly to systems for editing television recordings on magnetic tape.

The most economical and expeditious system for recording television program information is a magnetic tape system which uses at least partially transverse recording on the magnetic tape. The most accurate and versatile system of this kind employs a head drum having circumferentially placed magnetic heads which rotate transversely to the longitudinal axis of movement of a relatively wide magnetic tape. By employing a drum speed which is high relative to the longitudinal tape speed, an extremely wide range of frequencies can be recorded and reproduced. Additionally, through the use of various timing and servo controls the original signal can be reproduced with a high order of time base stability. This system also permits the use of additional longitudinal tracks on the wide tape, for audio and other purposes.

In the transverse track type of system, information is recorded with extremely high density but in repetitively recurring patterns which correspond to the successive frames of the television picture information. In the recording and processing of television program material, it is often desirable or necessary to revise the recorded pattern so as to add or substitute different sequences or rearrange the material in other ways. This type of editing must be accomplished in a way which does not disrupt the vertical synchronizing signal sequence, so as to cause objectionable roll-over in the reproduced picture. When working from the recorded tape alone, however, it is extremely difficult to find or mate together two sections of program material, even if the synchronizing problem is ignored.

In order to overcome some of these difficulties, systems have been adopted for the mechanical editing of program information through the use of edit or marker pulses which are recorded on a selected longitudinal track on the tape, together with a magnetizable compound which visibly displays the recorded patterns, and the use of a mechanical splicer device. With such a system, it is possible to find the beginning and end of successive frames, and to join together separate lengths of tape so as to form a desired sequence of program material.

Mechanical splicing techniques, however, are both expensive and time consuming. The high quality and expensive tape which is used is successively shortened during an editing process, and a number of spare lengths are accumulated which can no longer be used. The mechanical selection and placement of the ends which are to be joined together requires great skill of the operator. For this reason, program directors and editors often find it inconvenient or difficult to arrange a sequence of separately recorded program segments, or to interleave prerecorded material with newly recorded material in a desired fashion. It would be preferable to employ an automatically operated and electronically controlled system for precisely adding to or revising previously recorded television material. Such changes should be made, however, without losing synchronization and without creating lengths of blank tape.

It is, therefore, an object of the present invention to provide an improved system for permitting rearrangement and editing of television signal information recorded on a magnetic tape.

Another object of the present invention is to provide a novel system for automatically controlling the addition of recorded information in synchronism with previously recorded signal information provided in recurring patterns.

Still another object of the present invention is to provide an improved system for editing television program material recorded by a transverse track magnetic tape system, without loss of synchronization or the creation of blank spaces.

Editing systems for magnetically recorded television program material operate, in accordance with the present invention, to add new program material without loss of continuity. As a previous recording is reproduced, the recording of new material may be initiated. Edit pulses, that are generated by and derived from studio synchronizing apparatus and that define successive television frames, are used to control the start of a timed cycle in which previously recorded video signls are first erased. Then, as the point of erasure on the tape reaches the recording head, the new video information is recorded in synchronism with the previous recording. A synchronizing apparatus that may provide the necessary edit pulses is described in U.S. Patent 3,017,462 and patent application S.N. 106,573, filed April 21, 1960, and May 1, 1961, respectively, and both assigned to the same assignee.

In a specific example of a television signal editing system, the start of the timed cycle is denoted by the first edit pulse recorded on one of the additional longitudinal tracks and which occurs after a start signal is introduced. A fixed delay is used before erasure of the video signal is begun, and a second delay, which is controlled by a predetermined number of edit pulses or timing reference pulse determines the beginning of the new video recording. These two delays are proportioned according to the space between the video erase head and the video recording head, so that the recording begins at the exact same point on the tape that the erasure began. The use of the edit pulse to control the new recording keeps the new recording in synchronism with the previous recording. Concurrently, audio erasure and recording are also initiated in a timed cycle. The editing system also is arranged to receive stop signals which again initiate timed cycles, utilizing substantially the same elements, to cause, in a controlled and related fashion, the termination of the erasure of video, the video recording, and the audio erase. The editing system of this invention may be employed for insertion of new video information between two portions of previously recorded information by re-recording over a portion of old information; or by assembling or adding new information to the master tape. During an insertion process, the previously recorded control track may be employed; whereas for the assembly process a new control track is required. Reference may be made to patent application S.N. 106,573 for elaboration.

A better understanding of the invention may be had by reference to the following description taken in conjunction with the accompanying drawings in which.

Figures 1, 2:
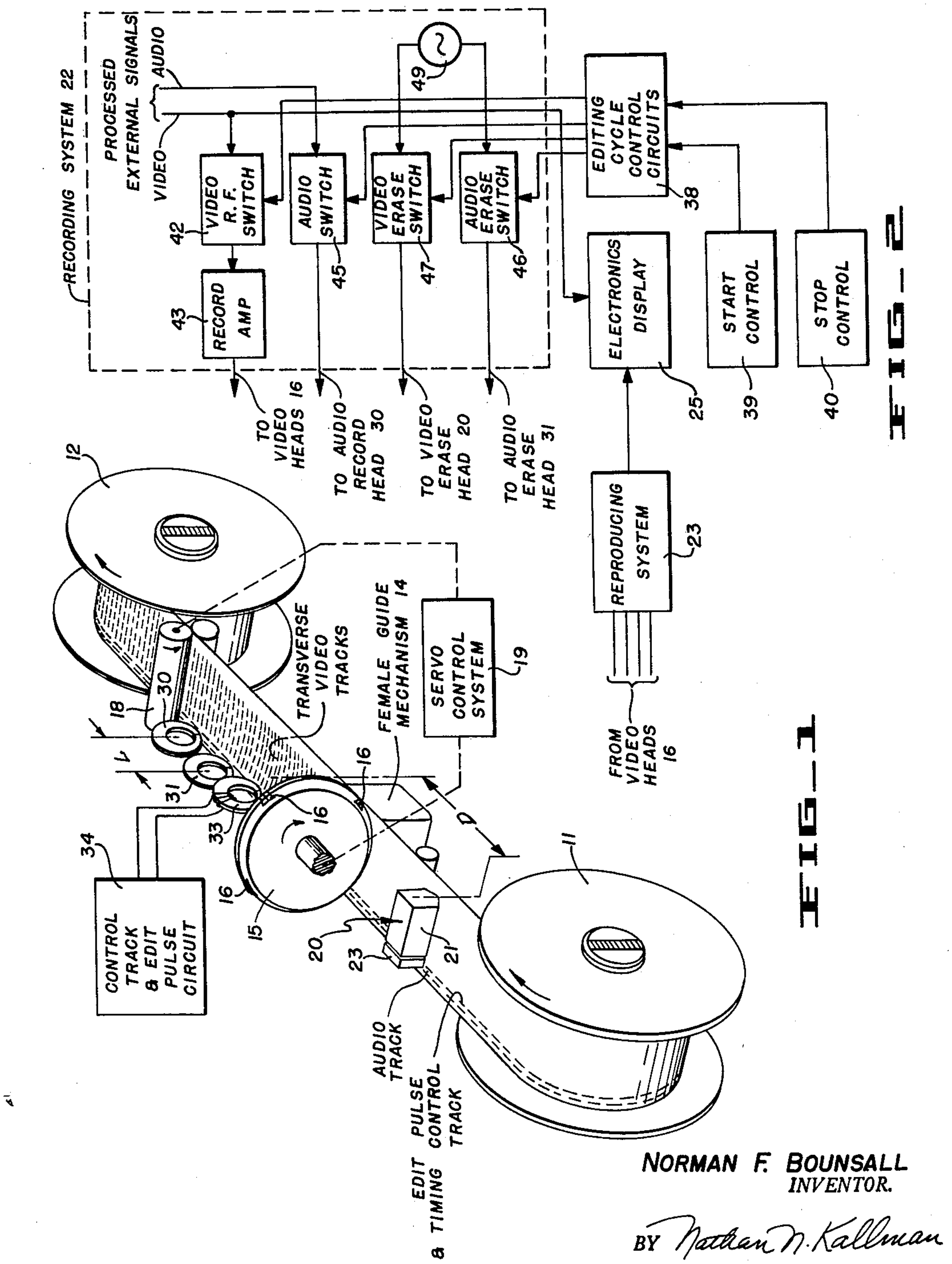
FIGURE 1 is a simplified representation in perspective and partially in block diagram form, of a part of the system in accordance with the invention for electronically editing television program information.
FIGURE 2 is a block diagram of the recording and reproducing system employed in conjunction with the system of FIGURE 1.

The principal elements of a magnetic recording system employing editing features in accordance with the invention are shown in simplified form in FIGURES 1 and 2. The system shown uses transverse track recording on a wide magnetic tape 10 which is moved between a supply reel 11 and a takeup reel 12. The drive systems for the reels 11, 12 and various guide systems have been omitted for simplicity. The tape 10 is cupped by a female guide mechanism 14 about a part of the circumference of a rotating head drum 15. Four video magnetic heads 16, only three of which can be seen in FIGURE 1, symmetrically placed about the circumference of the drum 15, are caused to sweep transversely across the tape 10 as it is driven longitudinally by a capstan 18. Greater time base stability is achieved by a servo control system 19 which controls the rates of operation of both the head drum 15 and the capstan 18. As is well-known, a timing wheel (not shown) may be utilized in conjunction with the drum 15 for the generation of signals representative of actual variations in the drum speed during recording, and these signals may then be recorded on a timing control track disposed longitudinally along the tape 10. Signals picked up at the timing control track during reproduction may be applied to the servo control system for varying the speed during reproduction in accordance with actual variations during recording. Alternatively, timing signal components (e.g., vertical and horizontal synchronizing signals) in the television signal may be used as reference signals for the servo control.

The video components recorded by the magnetic heads 16 are reproduced with greatest fidelity if, prior to recording, previously recorded signals have been erased. Accordingly, a video erase head assembly 20 extending transversely across the tape 10 is positioned a predetermined distance (D) in advance of the video magnetic heads 16 on the drum 15. The video erase head assembly 20 comprises an erase head portion 21 that covers only the central part of tape 10 on which the video patterns are recorded. The longitudinal timing control and edit pulse track may be erased independently by a separate erase head portion 23, as described in the aforementioned patent application S.N. 106,573. The tracks are shown visible in FIGURE 1 only for ease of understanding, of course.

A recording system 22 is coupled to the head drum 15 during the recording mode, and a reproducing system 23 is coupled to the head drum during the playback mode. As shown in FIGURE 2, the recording system 22 includes, in an actual application, audio and video signal sources, processing circuits and modulators, as well as synchronizing signal sources and the like, these being understood to be present but not shown for simplicity. The reproducing system 23 includes an amplifier, switching circuits, timing control circuits synchronized with the head drum 15 so as to control the switching circuits, and signal demodulators. For the purposes of the present editing system, the ultimate use (monitoring or broadcast) of the reproduced signals is not significant, except that for the purposes of editing, the signals may be provided to an electronics display 25 so that a program director may view the presentations, as television program material from the recording system 22 is added to previously recorded material on the tape 10. For the purpose of obtaining a preview of the arrangement of the program material, the electronics display system 25 may be operated directly from the recording system 22 as well as from the reproducing system 23.

An audio recording head 30 is positioned along the audio track at a point subsequent (relative to the tape 10) to the head drum 15. The audio recording head 30 is preceded at a predetermined distance (L) by an audio erase head 31. An edit pulse is recorded on the timing control and edit pulse track for each vertical synchronizing pulse on the recorded television signal by an edit pulse and control track head 33 which is spaced a fixed and known distance from the recording point of the video record heads 16. Vertical synchronizing pulses derived from the recording system 22 are applied as edit pulses to the edit pulse and control track head 33 through an edit pulse and control track circuit 34.

The principal operating elements for editing, in accordance with the invention, are contained within editing cycle control circuits 38, which are described in detail with reference to FIGURE 2. The editing cycle control circuits 38 are governed principally by a start control 39 and a stop control 40, and the control circuits 38 in turn control various switches within recording system 22 so as to insure the proper sequencing of information on the tape 10. The controlled elements within the recording system 22 are principally a video RF switch 42, which is coupled through record amplifiers 43 to the video magnetic heads 16 on the drum 15, an audio switch 45 which is coupled to the audio record head 30, an audio erase switch 46 coupled to the audio erase head 31 and a video erase switch 47 coupled to the video erase head 20. Erase signals are provided to the erase switches 46, 47 from an erase signal source 49.

Figure 3:
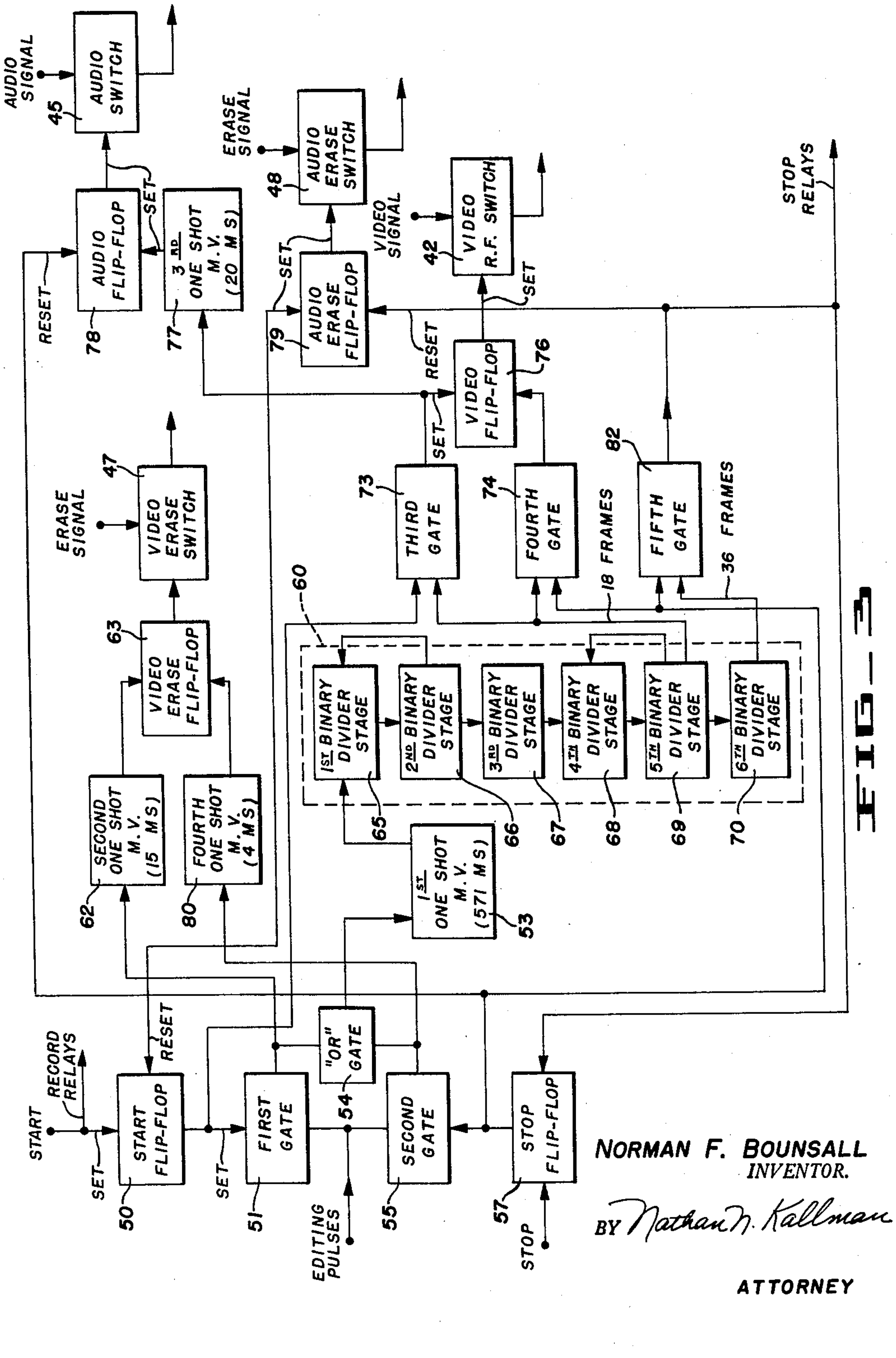
FIGURE 3 is a block diagram representation of the elements employed in a timing cycle control system of an editing system in accordance with the invention.

Only a brief description of the operation of FIGURE 1 need be given here, inasmuch as a complete understanding of the functioning of the editing cycle control circuits 38 may be had by reference to the detailed diagram of FIGURE 3. Briefly, however, actuation of the start control 39 commences a timed cycle in which two delays are concurrently initiated. A first delay is a fixed delay, at the termination of which the video erase circuit 47 actuates the video erase head 20 from the erase signal source 49. The second delay is a predetermined delay defined by an integral number of edit pulses, following which the video RF switch 42 is actuated so as to initiate recording in synchronism with a given vertical synchronizing pulse. The difference between the fixed delay used before erasure of the video, and the delay determined by counting the edit pulses, corresponds to the time required for the tape 10 to traverse the distance D from the video erase head 20 to the video record heads 16. In this way, video recording begins at the point of erasure as well as with a vertical synchronizing pulse, and is in synchronism with the previously recorded synchronizing pulses. In addition, the editing process of this invention ensures that the "electronic splicing" occurs between the recorded transverse tracks of information, specifically at the end of a frame, thus precluding any loss or overlap of signal information.

At a later time, measured from the initiation of video recording, the audio erase head 31 is actuated, and then after a still further fixed delay, the external audio is applied through the audio switch 45 to the audio recording head 30. Recording then continues for as long as it is desired to add program material. This recording commences automatically, without waste of tape space and in synchronism with the previous recording.

On the actuation of the stop control 40, the audio recording is turned off immediately. The video erase is turned off after a predetermined fixed delay, which, however, is different from the previously selected delay. The video recording process is not finally terminated until a predetermined number of frames, ascertained by counting the edit pulses, has passed the head drum mechanism 15.

Editing cycle control circuits corresponding to the circuits 38 discussed above in conjunction with FIGURE 2 and providing control signals in a timed cycle are shown in FIGURE 3. The circuits 38 consist of various flip-flops, coincidence gates, "OR" circuits and switches, all of which are well-known in the art and need not be explained in detail. The various circuit subcombinations may conveniently be discussed in conjunction with the separate timing cycles which are defined during the overall operation. The circuits 38 may be said to consist, in general, of a number of functional parts which operate together to supply the general functions of coordinating the start, stop and edit pulses to operate the video erase control, audio control, audio erase control and video RF control.

The description of circuit operation is again in accordance with the previous example, namely the recording of composite television signals and the editing and rearrangement of television program information. It will be assumed that the system is operating in the reproduce mode initially, so that program editors may be viewing program material on the display 25 provided therewith. At a selected point in the program, they may then desire to switch in signals provided from a live performance, a recorded performance, or from a separate, concurrently running television tape recording and reproducing system. The editing cycle control circuits 38 insure that the various switches 42, 45, 47 and 46 provide synchronous addition of the new program material to the previously recorded program material at an appropriate point along the tape 10 following the introduction of a "start" record signal. The start signal is applied to record relays in the recording system, to switch the system into the record mode, but, until the various switches are operated, the new program material is not recorded on the tape.

With the tape recording and reproducing system operating, in the "Insert" mode for example, edit pulses are provided continuously, at precisely spaced intervals corresponding to the successive television frames recorded on the tape. The start signal is provided at some random time relative to the edit pulses. As shown in FIGURE 3, the start signal sets a start flip-flop 50, the set output signal from which conditions a first "AND" or coincidence gate 51, which is hereafter referred to simply as the first gate 51. A similar convention is also observed as to the other "AND" gates described hereafter. Once the start flip-flop 50 is set, edit pulses are applied from the first gate 51 to the input terminal of a first one-shot multivibrator 53 through an "OR" gate 54. The "OR" gate 54 is used to isolate the output terminal of the first gate 51 from the output terminal of a second gate 55. The second gate 55 also receives the edit pulses, but is not conditioned to pass these pulses at the time of application of the start pulse because it is controlled by the set output of a stop flip-flop 57 which at this point in time is in the reset state. Output signals from the first one-shot multivibrator 53 consist of pulses of 571 microsecond duration, each of which is generated in response to a different edit pulse. The pulses are applied to be counted in a counter circuit 60 which consists of successive binary stages arranged with certain intercouplings in a manner described in more detail below.

Edit pulses which are passed by the first gate 51 are also applied to actuate the video erase switch 47 after a first, predetermined and fixed delay following application of the start pulse. This is accomplished by using the gated edit pulses from the first gate 51 to actuate a second one-shot multivibrator 62 to provide a pulse whose trailing edge sets a video erase flip-flop 63. The set output signal from the video erase flip-flop 63 then turns on the video erase switch 47, thus erasing the previously recorded video on the transverse tracks. A fixed delay of 15 milliseconds is introduced subsequent to the first edit pulse occurring after the start pulse, because of the length of the pulse from the second one-shot multivibrator 62. Due to the fact that the delay interval is clocked starting with an edit pulse, and because the edit pulse denotes the passage of a video recording head across the tape at the time at which a vertical synchronizing pulse is present, and further because the longitudinal movement of the tape is substantially constant, the video erase always commences at substantially a selected point relative to the recorded frames on the tape.

The binary stages within the counter 60 are so set that different counts of the edit pulses may be made for different purposes.

The stages 65–70 of the counter 60 are binary divider circuits, such as bistable multivibrators. These circuits are specially intercoupled to provide other than a straightforward binary division. The second stage 66, for example, is coupled back to the first stage 65, so that the second stage 66 does not provide output signals on each fourth input pulse, but instead provides an output signal indication on each third input pulse. If the first two stages 65, 66 are bistable multivibrators, for example, the separate halves of which represent binary "0" and binary "1" respectively, each stage 65, 66 provides an output pulse when it is being returned to the "0," or initial state. With the feedback coupling, however, whenever the second stage 66 is set to the "1" state a pulse is returned to the first stage 65 so that stage is also set to the "1" state. The next pulse which is applied to the first stage 65 therefore sets both of the stages to binary "0," and provides the desired output pulse from the second stage 66 for each three input edit pulses. The binary states represented by the first two stages 65, 66 therefore proceed in a repetitive cycle as follows:

| Input Pulses | Binary States | Output Pulses From Second Stage |
|---|---|---|
| | 00 | |
| 1 | 01 | |
| 1 | 11 | |
| 1 | 00 | 1 |
| 1 | 01 | |
| 1 | 11 | |
| 1 | 00 | 1 |

The pulse indications provided from the third stage 64 subsequently represent each sixth edit pulse provided to the counter 60. A feedback arrangement is also used between the fourth stage 68 and the fifth stage 69, so that the output signal derived from the fifth stage 69 represents the termination of the eighteenth frame. The output signals derived from the final binary divider stage 70 therefore represent each thirty-sixth frame.

The signals from the fifth stage 69 in the counter 60 which represent the eighteenth frame subsequent to the initiation of the count are used to actuate third and fourth gates 73, 74 respectively. The third gate 73 is conditioned by signals from the set output terminal of the start flip-flop 50, while the fourth gate 74 is conditioned by signals from the set output terminal of the stop flip-flop 57. At points in time immediately subsequent to the application of the start pulse, the third gate 73 is conditioned to pass signals. These signals are applied to set a video flip-flop 76, output signals from the set terminal of which operate the video RF switch 42. On the occurrence of the eighteen frame count, therefore, video signals are coupled through the RF switch 42 to the video recording heads 16 in the magnetic recording system.

The eighteen frame interval, of course, is a substantially constant time period. The time interval between the end of the fifteen millisecond interval (after which the video erase switch 47 is activated), and the end of the eighteen frame interval (after which the video RF switch 42 is activated) is therefore also a constant. The interval thus defined is proportioned, relative to the speed of advance of the tape, to the distance D along the tape between the video erase head 20 and the video record heads 16, as shown generally in FIGURE 1. Accordingly, video recording is begun at the point at which erasure was previously begun. Further, the video recording is begun in synchronism with the edit pulses, and therefore is maintained in synchronism with the previously recorded vertical synchronizing pulses, so that no space is wasted and there is no loss of synchronization because of the switch-over to the new recording.

The passage of the signal through the third gate 73 also is used to control the actuation of a third one-shot multivibrator 77. The third one-shot multivibrator 77 provides a pulse of substantially 20 milliseconds duration, the trailing edge of this pulse being used to set an audio flip-flop 78. When the audio flip-flop 78 is set (20 ms. after the start of video recording) the audio switch 45 is actuated, permitting recording of the audio program signal. A "clean" audio track is provided for recording by actuating the audio erase switch 48 with the pulse passed by the third gate 73, concurrently with the commencement of video recording. An audio erase flip-flop 79 which controls the audio erase switch 48 is set by the pulse from the third gate 73. The 20 ms. time between the actuation of the audio erase and the audio record switches 48, 45 respectively, also corresponds to the time needed for a specific point on the tape 10 to pass the distance L between the audio erase head 31 and the audio record head 30 at normal speed.

Figure 4:
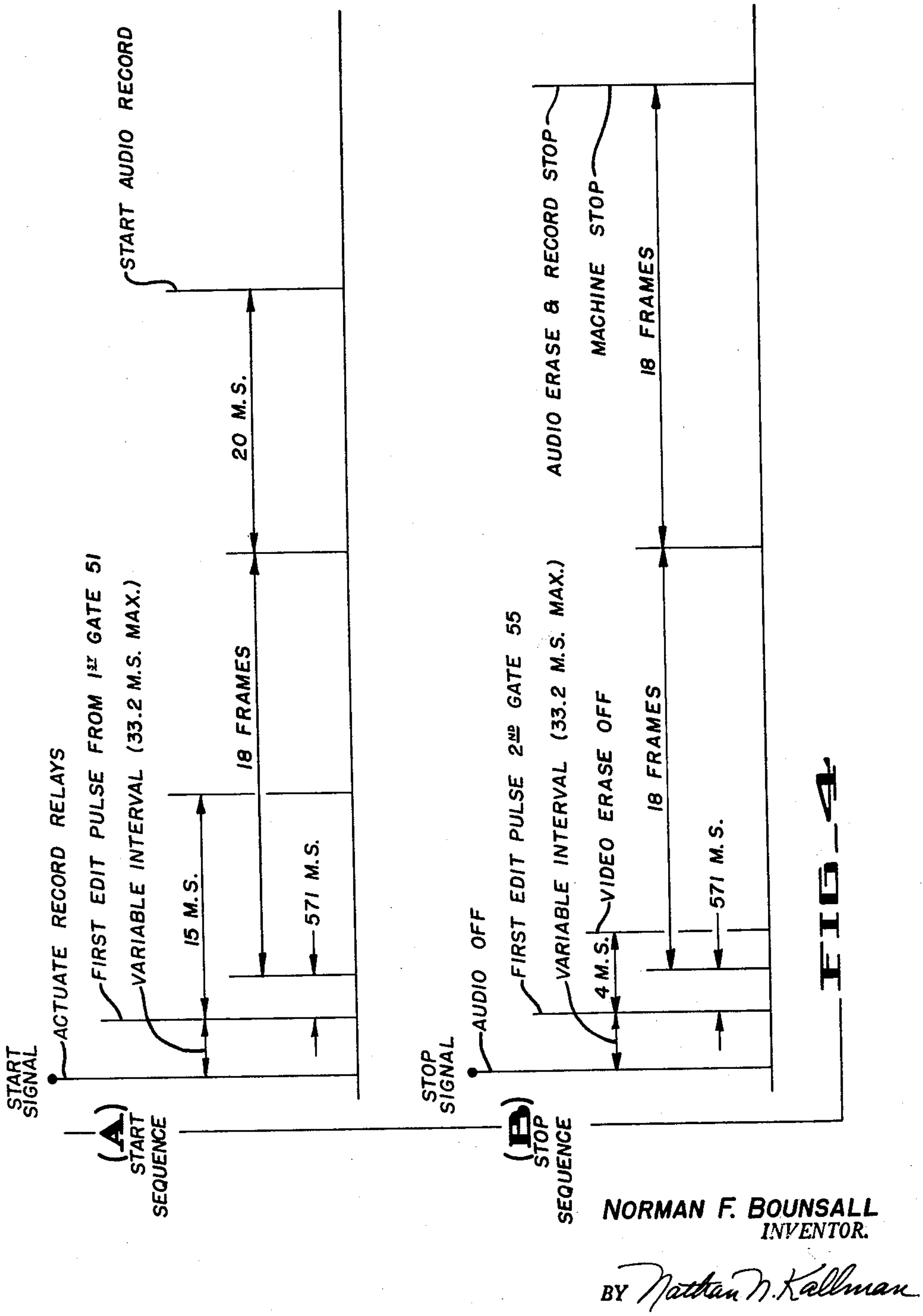
FIGURE 4 is a timing chart, showing the time sequence in which various elements operate in systems in accordance with the present invention.

The sequence of events given above is shown in the timing diagram (A) of FIGURE 4, in which the start sequence is represented. The start button is actuated at some indeterminate time relative to the pattern then recorded on the tape. The record relays in the system are closed immediately, but as previously discussed, the system is merely switched by this from the reproducing to the recording mode. The longest time that might be utilized before initiation of the actual timing cycle is the time required for a full frame of the television signal, namely 33.2 milliseconds. At the first edit pulse thereafter, a signal is passed by the first gate 51. This signal marks the start of the 15 millisecond delay, controlled by the second one-shot multivibrator 62, following which the video erase is begun. The signal from the first gate 51 also marks the start of the 571 microsecond delay, which is introduced into each of the edit pulses applied to the counter. At the end of the eighteen frames determined by counting the edit pulses, the video flip-flop 76 and the audio erase flip-flop 79 are set by the pulse from the third gate 73, so as to actuate the video RF switch 42 and the audio erase switch 48 simultaneously. This simultaneous actuation also coincides with the initiation of the final timing cycle, controlled by the third one-shot multivibrator 77, which sets the audio flip-flop 78 so as to turn on the audio switch 45 and begin the audio recording. Note particularly that the pulse indicating the eighteen frame count from the third gate 73 also resets the start flip-flop 50, so that the counter 60 does not continue to count. Instead the same pulse is used to reset the counter 60 for the stop sequence.

Upon the application of a stop signal to the stop flip-flop 57, most of the same elements are employed, but in a different timed cycle in which each of the active switch units is turned off in an orderly and related sequence. The stop signal is used directly, to shut off the audio by resetting the audio flip-flop 78. The timed cycle is commenced from the first edit pulse received after the start signal, this pulse being passed by the previously conditioned second gate 55. Thereafter, the edit pulses are applied through the "OR" gate 54 from the second gate 55 to actuate the one-shot multivibrator 43 so that the pulses are counted by the counter 60. Also, at this time, the first edit pulse in the series is applied to a fourth one-shot multivibrator 80 which generates a rectangular pulse of 4 milliseconds duration. The trailing edge of the 4 ms. pulse is applied to reset the video erase flip-flop 63, turning off the video erase switch 47 and the video erase signal.

As the pulses are applied to the counter 60, counting proceeds in the same manner as previously described in conjunction with the start cycle. At this time, however, the third gate 73 is closed and the fourth gate 74 is conditioned to pass a pulse from the counter 60 which is indicative of the occurrence of the eighteenth frame. Accordingly, the output signal from the fourth gate 74 resets the video flip-flop 76, turning off the video RF switch 42. This terminates the video recording.

Audio erase continues for another eighteen frames, however, and this is controlled by a fifth gate 82 which is conditioned by the set output signals from the stop flip-flop 57 and which receives signals indicative of the thirty-sixth frame from the counter 60. At the thirty-sixth frame on the tape, subsequent to the initiation of the timing cycle for the stop sequence, the stop signal derived from the fifth gate 82 resets the audio erase flip-flop 79, turning off the audio erase switch 48.

A better understanding of the stop sequence may be had by reference to the timing diagram of FIGURE 4(B). The timing cycle for the stop sequence begins with the setting of the stop flip-flop 57, which is directly coupled to turn off the audio switch 45 through the audio flip-flop 78. Again, a variable delay interval exists which is not in excess of a single television frame in order to initiate the remainder of the cycle with the first following edit pulse, as applied through the second gate 55. Four milliseconds after the first edit pulse the trailing edge of the pulse from the fourth one-shot multivibrator 80 resets the video erase flip-flop 63 so as to shut off the video erase switch 47. Eighteen frames are then counted before the video RF switch is turned off under control of the fourth gate 74 and the video flip-flop 76. Another eighteen frames is then counted off before a pulse is applied from the fifth gate 82 to reset the audio erase flip-flop 79 and to turn off the audio erase switch 48, concurrently with the provision of a pulse to the stop relay to turn off the machine. This pulse also resets the stop flip-flop 57, so as to place the system in condition for beginning operation with a new edit sequence.

This system may therefore be seen to be of general applicability where it is desired to edit and revise or add to program material recorded on magnetic tape. Whether transverse or longitudinal recording is used, the longitudinal spacing between the erase and record heads will be known. It is important, of course, that there be provision for recording and reproducing edit pulses, but this can usually be accommodated even with relatively narrow tapes. The system is particularly advantageous for editing transverse track recordings, however, and for doing so automatically and electronically without loss of synchronism when switching between the successive program segments. It should be noted that the spacing between the various erase and record heads, and their placement relative to each other, is not of importance to the operation or arrangement of the system in accordance with the invention.

What is claimed is:

1. For a magnetic tape recording system having television signals recorded transversely thereon, with edit pulses recorded on a longitudinal track to denote separate television frames recorded on the tape, and with audio signals recorded on a separate longitudinal track, and including means responsive to television signals for recording such signals transversely on the tape, and erasing means spaced a predetermined distance from the means for recording, an editing system responsive to initiating signals and comprising: counter means, means responsive to the initiating sigals and the edit pulses for providing edit pulses to the counter means, means responsive to a first of the edit pulses following the initiating signals for providing a control pulse at a predetermined delay thereafter, means responsive to the control pulses for actuating the means for erasing, and means responsive to a predetermined number of edit pulses provided to the counter means for actuating the means for recording, the predetermined number of edit pulses having a selected relationship to the predetermined delay, such that recording is effectuated precisely on the tape portion that has just been erased and in synchronism with the previous recording.

2. For a magnetic tape recording system having signals recorded thereon with marker signals recorded separately to denote periodically recurring segments of signal information, the system having record means and spaced apart erase means, a system for adding further segments of signal information in synchronism with previously recorded information, including means providing an initiating signal, means responsive to the initiating signal and the marker signals for operating the erase means at a predetermined delay after the first marker signal following the initiating signal, and means responsive to the initiating signal and the marker signals for operating the record means at a predetermined delay defined by an integral number of marker signals following the initiating signal, the difference in time between actuation of the initiating signal and the marker signal corresponding to the time required for the tape to move between the erase means and the record means.

3. A system for electronically editing periodically recurring signal information recorded on magnetic tape and including marker signals, including means for selecting marker signals subsequent to an initiating signal, means for erasing the recorded signal information, delay means responsive to a first of the marker signals subsequent to an initiating signal for actuating the means for erasing, means for recording new signal information, and counter means responsive to a predetermined number of the marker signals subsequent to an initiating signal for actuating the means for recording.

4. A system for electronically editing television program information recorded on magnetic tape and including edit signals corresponding in time to vertical synchronizing signals, including means responsive to an externally provided initiating signal for selecting edit signals subsequent thereto, record means past which the tape moves, erase means positioned along the tape ahead of the record means relative to the tape movement, means responsive to a first of the edit signals subsequent to an initiating signal for actuating the erase means at a predetermined delay thereafter, and means responsive to a preselected number of edit signals subsequent to an initiating signal for actuating the record means, the difference in time between actuation of the erase means and actuation of the record means corresponding to the time required for the tape to move between the erase means and the record means, so that the erased part of the tape reaches the record means as recording begins in synchronism with previously recorded synchronizing signals.

5. A system for both erasing and recording a new television signal on a magnetic tape subsequent to the termination of a previously recorded television signal, with the newly recorded signal being recorded in synchronism with the previously recorded signal, the system including means for reproducing the recorded signal, means for deriving separately recorded edit pulses from the reproduced signal, the edit pulses occurring coincidently with vertical synchronizing pulses, means for providing an initiating signal for recording, a recording head having a fixed longitudinal position relative to the magnetic tape, an erase head having a fixed longitudinal position relative to the recording head, and being at a position along the tape which precedes the recording head, means responsive to the derived edit pulses and the initiating signal for providing a timing reference signal concurrent with a vertical synchronizing pulse, means responsive to the edit pulses for counting a selected number of pulses, means responsive to the count from the counting means for switching on the recording head at a selected number of pulses, and means responsive to the timing reference signal for switching on the erase head after a selected fixed delay.

6. A system for editing and subsequently recording a new television signal on a magnetic tape having a television signal previously recorded thereon, which system is arranged to erase a portion of the previously recorded television signal and to record the new television signal in synchronism with the previously recorded television signal, the system comprising means for reproducing the television signals recorded on the tape; means for deriving separately recorded edit pulses from the reproduced signals, the edit pulses being coincident in time with television synchronizing signals recorded on the tape; means for developing a start signal; a television recording head having a fixed longitudinal position relative to the magnetic tape; an erase head having a fixed longitudinal position relative to the recording head and disposed at a position upstream of the recording head with respect to the direction of movement of the tape; means responsive to the edit pulses and to the start signal for providing timing reference pulses which are concurrent in time and commence with the first of the edit pulses to occur after the start signal is initiated; means responsive to the timing reference pulses for activating the erase head after a selected fixed time delay; counting means responsive to the timing reference pulses for providing a count signal upon counting a selected number of timing reference pulses; and means responsive to said count signal for activating the recording head, whereby the erase head begins erasing the tape and the recording head begins recording the new television signal after a time delay so that the new recording is initiated upon the erased tape portion as it appears at the recording head and in synchronism with the previous recording.

7. A system for editing and subsequently recording a new television signal on a magnetic tape having a television signal previously recorded thereon, the system erasing a portion of the previously recorded television signal and recording the new television signal in synchronism with the previously recorded television signal, the system comprising means for reproducing the television signals recorded on the tape; means for deriving separately recorded edit pulses from the reproduced signals, the edit pulses being coincident in time with television synchronizing signals recorded on the tape; manually operated means for developing a start signal; a video recording head having a fixed longitudinal position relative to the magnetic tape for recording a video track on the tape; a video erase head having a fixed longitudinal position relative to the video recording head and disposed at a position upstream of the recording head with respect to the direction of movement of the tape; an audio erase head disposed adjacent to and downstream of the video recording head; an audio recording head disposed adjacent to and downstream of the audio erase head for recording an audio track in a predetermined position on the tape; means responsive to the edit pulses and to the start signal for providing timing reference pulses which are concurrent in time and commence with the first of the edit pulses to occur after the start signal is initated; means responsive to the timing reference pulses for activating the video erase head after a selected fixed time delay; counting means responsive to the timing reference pulses for providing a count signal upon counting a selected number of timing reference pulses; means responsive to the count signal for activating the video recording head and the audio erase head; and further means responsive to the count signal for activating the audio recording head after a selected fixed time delay.

8. In a system for recording television signals on a magnetic tape and including a video erase head disposed adjacent the tape, a video recording head disposed adjacent the tape and downstream of the video erase head with respect to the direction of movement of the tape for recording a video track on the tape; an audio erase head disposed adjacent and downstream of the video recording head, an audio recording head disposed adjacent and downstream of the audio erase head for recording an audio track in a predetermined position on the tape, a mechanism for editing the tape which bears previously recorded audio and video tracks. The mechanism including means for deriving separately recorded edit pulses from the reproduced signals, the edit pulses being coincident in time with television synchronizing signals recorded on the tape; manually operated means for developing a start signal; means responsive to the edit pulses and to the start signal for providing timing reference pulses which are concurrent in time and commence with the first of the edit pulses to occur after the start signal is initiated; means responsive to the timing reference pulses for activating the erase head after a selected fixed time delay; counting means responsive to the timing reference pulses for providing a count signal upon counting a selected number of timing reference pulses; means responsive to the count signal for activating the video recording head and the audio erase head; and further means responsive to the count signal for activating the audio recording head after a selected fixed time delay.

9. In a system for recording television signals on a magnetic tape including a video erase head disposed adjacent the tape, a video recording head disposed adjacent the tape and downstream of the video erase head with respect to the direction of movement of the tape for recording a video track on the tape, a mechanism for editing the tape which bears a previously recorded video track, the mechanism including means for deriving separately recorded edit pulses from the reproduced signals; the edit pulses being coincident in time with television synchronizing signals recorded on the tape; means for developing a start signal; means responsive to the edit pulses and to the start signal for providing timing reference pulses which are concurrent in time and commence with the first of the edit pulses to occur after the start signal is initiated; means responsive to the timing reference pulses for activating the erase head after a selected fixed time delay; counting means responsive to the timing reference pulses for providing a count signal upon counting a selected number of timing reference pulses; and means responsive to the count signal for activating the video recording head after a predetermined number of counts.

10. A system for editing and subsequently recording a new television signal on a magnetic tape having a television signal previously recorded thereon, the television signal including synchronizing signals, comprising magnetic tape reproducing head means for reproducing the television signal previously recorded on the magnetic tape; edit pulse reproducing means for deriving sepaately recorded edit pulses, the edit pulses being coincident in time with the synchronizing signals; means for developing a start signal; a magnetic tape recording head disposed adjacent and having a fixed longitudinal position relative to the magnetic tape; a magnetic tape erase head having a fixed longitudinal position relative to the recording head and disposed at a position upstream of the recording head with respect to the direction of movement of the magnetic tape; a gating circuit having an output terminal and coupled to the edit pulse reproducing means and to the means for developing a start signal and responsive to the edit pulses and to the start signal for providing gated edit pulses to the output terminal only in response to the start signal; a first delay means coupled to said gating circuit for providing a first delay of the gated edit pulses; erase switching means coupled to the first delay means for switching on the magnetic tape erase head; second delay means coupled to the gating circuit for providing a second of the gated edit pulses; counter means coupled to the second delay means for providing count signals indicative of a time delay of a selected number of edit pulses; and a recording switch coupled to the counter means for switching on the magnetic tape recording head.

11. A system for editing and subsequently recording a new television signal on a magnetic tape having a television signal previously recorded thereon, the television signal including synchronizing signals, comprising magnetic tape reproducing head means for reproducing the television signal previously recorded on the magnetic tape; edit pulse reproducing means for deriving separately recorded edit pulses, the edit pulses being coincident in time with the synchronizing signals; means for developing a start signal; a magnetic tape video recording head disposed adjacent and having a fixed longitudinal position relative to the magnetic tape; a magnetic tape video erase head having a fixed longitudinal position relative to the video recording head and disposed at a position upstream of the video recording head with respect to the direction of movement of the magnetic tape; an audio erase head disposed adjacent to and downstream of the video recording head; an audio recording head disposed adjacent to and downstream of the audio erase head; a gating circuit having an output terminal and responsive to the edit pulses and to the start signal for providing gated edit pulses at the output terminal only in response to the start signal; first delay means coupled to said gating arrangement for providing a first delay of the gated edit pulses; video erase switching means coupled to the first delay means for switching on the video erase head; second delay means coupled to the gating circuit for providing a second delay of the gated edit pulses; counter means coupled to the second delay means for providing count signals indicative of a time delay of a predetermined number of edit pulses; a video recording switch and an audio erase switch coupled to the counter means for switching on said video recording head and the audio erase head respectively; third delay means coupled to said counter means for providing a third delay of the count signal; and an audio record switch coupled to the third delay means for switching on the audio recording head.

No references cited.